(12) United States Patent
Marth

(10) Patent No.: US 9,557,518 B2
(45) Date of Patent: Jan. 31, 2017

(54) METHOD AND ARRANGEMENT FOR OPERATING A DYNAMIC NANO FOCUSING SYSTEM

(75) Inventor: Harry Marth, Waldbronn (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 171 days.

(21) Appl. No.: 14/233,186

(22) PCT Filed: Jul. 5, 2012

(86) PCT No.: PCT/EP2012/063068
§ 371 (c)(1),
(2), (4) Date: Mar. 26, 2014

(87) PCT Pub. No.: WO2013/017367
PCT Pub. Date: Feb. 7, 2013

(65) Prior Publication Data
US 2014/0198381 A1 Jul. 17, 2014

(30) Foreign Application Priority Data

Aug. 1, 2011 (DE) .......... 10 2011 052 333
Dec. 22, 2011 (DE) .......... 10 2011 121 928

(51) Int. Cl.
*G02B 7/04* (2006.01)
*G02B 21/24* (2006.01)

(52) U.S. Cl.
CPC .............. *G02B 7/04* (2013.01); *G02B 21/242* (2013.01); *G02B 21/244* (2013.01)

(58) Field of Classification Search
CPC .... G02B 7/04; G02B 7/08–7/105; G02B 7/28; G02B 7/282; G02B 7/32; G02B 7/36–7/40; G02B 21/241; G02B 21/242; G02B 21/244–21/247; G02B 13/009;G02B 15/14–15/15; G02B 15/22; G03B 3/00; G03B 3/10–3/12; H04N 5/23212; A61B 3/00; A61B 3/0075; A61B 3/0083; A61B 3/10–3/165

(Continued)

(56) References Cited

U.S. PATENT DOCUMENTS 4,291,958 A * 9/1981 Frank .................. G03B 7/16
352/140
4,903,134 A * 2/1990 Murashima ........ H04N 5/23212
348/347

(Continued)

FOREIGN PATENT DOCUMENTS

DE 9209515 10/1992 ............... G12B 1/00
DE 20106831 9/2001 ............... G02B 7/04

(Continued)

OTHER PUBLICATIONS

Official Communication, an Office Action, dated Sep. 22, 2014, issued by the German Patent Office, for priority German Patent Application No. DE102011121928.9, filed on Dec. 22, 2011, with an English translation thereof.

(Continued)

*Primary Examiner* — Stephone B Allen
*Assistant Examiner* — Adam W Booher
(74) *Attorney, Agent, or Firm* — Bodner & O'Rourke, LLP; Gerald T. Bodner; Christian P. Bodner

(57) ABSTRACT

The invention relates to a method and to an arrangement for operating a dynamic nano focusing system for use thereof in the field of microscopy, interferometry or similar applications, wherein the nano focusing system comprises a lever-transmission piezo actuator and a frictionless guide based on a resiliently deformable solid body joint which is connected to a mounting unit, in particular for a lens, in order to implement the desired adjustment paths for the focusing.

(Continued)

Figure 1:
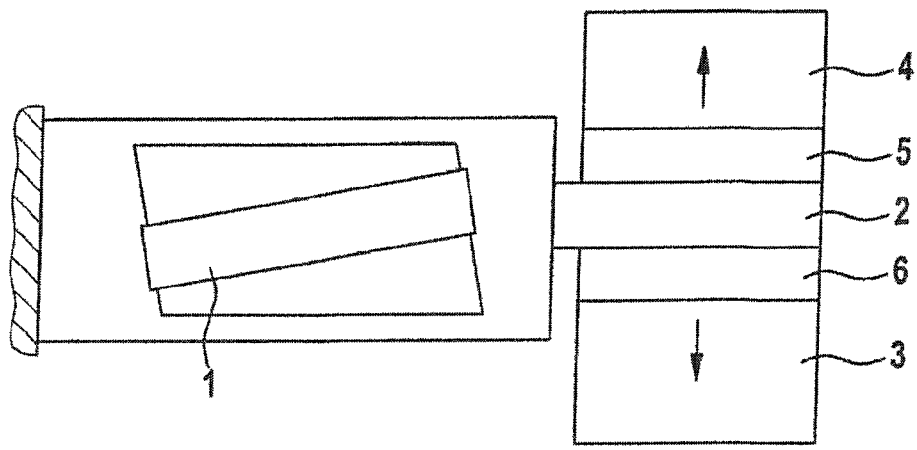

According to the invention, in order to increase the dynamics during the focusing process, a secondary fine adjustment movement is superimposed on the primary adjustment movement, said secondary fine adjustment movement having a smaller adjustment path but higher frequency than the primary adjustment movement, wherein, when the fine adjustment is carried out, a determination is made as to whether the focusing result changes, in order to specify according thereto the amount and/or the direction of the primary adjustment movement.

6 Claims, 5 Drawing Sheets

(58) Field of Classification Search
USPC ............. 359/383, 694–698, 705; 396/77–82; 348/79, 80, 207.99, 208.11–208.13, 348/240.99–240.3, 345, 348, 349, 353–356; 382/255; 351/200–221, 233–247
See application file for complete search history.

(56) References Cited

U.S. PATENT DOCUMENTS

| | | | | |
|---|---|---|---|---|
| 5,101,278 A | | 3/1992 | Itsumi et al. ................. | 358/227 |
| 5,136,149 A | * | 8/1992 | Fujiwara .................. | G02B 7/32 |
| | | | | 250/201.5 |
| 5,880,465 A | * | 3/1999 | Boettner ............ | G02B 21/0028 |
| | | | | 250/201.3 |
| 2004/0183405 A1 | | 9/2004 | D'Ouvenou ................... | 310/328 |
| 2009/0097140 A1 | | 4/2009 | Choi et al. ..................... | 359/824 |
| 2010/0091169 A1 | | 4/2010 | Border et al. ................ | 348/345 |
| 2010/0232161 A1 | * | 9/2010 | Aschwanden ........... | G02B 3/14 |
| | | | | 362/278 |
| 2012/0134017 A1 | | 5/2012 | Ganser .......................... | 359/383 |
| 2014/0153089 A1 | | 6/2014 | Ganser .......................... | 359/383 |

FOREIGN PATENT DOCUMENTS

| | | | | |
|---|---|---|---|---|
| DE | 102010060841 | 6/2012 | ............ | G02B 21/24 |
| EP | 1 433 209 | 6/2004 | ............ | F02M 51/06 |
| WO | WO 03/031798 | 4/2003 | ............ | F02M 51/00 |
| WO | WO 2011/049608 | 4/2011 | ............ | G02B 27/02 |

OTHER PUBLICATIONS

International Search Report of the International Searching Authority, in English, dated Feb. 7, 2013, the Written Opinion of the International Searching Authority, in English, dated Feb. 1, 2014, and the Notification Concerning Transmittal of the International Preliminary Report on Patentability and the International Preliminary Report on Patentability, in English, dated Feb. 4, 2014 for corresponding international (PCT) application having Serial No. PCT/EP2012/063068, filed on Jul. 5, 2012, each of which was issued by WIPO.
"Schnelle Piezo-Fokus Systeme für die Mikroskopie—jetzt digital und preisgüstiger", Jan. 1, 2011 (Jan. 1, 2011), XP55036049, retrieved from the internet: URL:http://www.physikinstrumente.de/de/news/fullnews.php?newsid=82 [retrieved on Aug. 22, 2012] (copy enclosed) (English translation enclosed).

* cited by examiner

METHOD AND ARRANGEMENT FOR OPERATING A DYNAMIC NANO FOCUSING SYSTEM

The invention relates to a method and an arrangement for operating a dynamic nanofocusing system for the use thereof in the field of microscopy, interferometry or similar applications, wherein the nanofocusing system comprises a lever-transmitted piezo actuator and a frictionless guide based on an elastically deformable solid-body joint which is connected to a receiving unit, in particular for an objective lens, so as to realize desired adjusting distances for the focusing according to the patent claims.

Focusing systems for high-resolution microscopes having a positioning and scan range of several hundred micrometers with a resolution up to the subnanometer range are already known in the prior art. Reference is here made to the high-precision objective scanner offered and distributed by the company Physik Instrumente (PI) GmbH & Co. KG, Karlsruhe, under the brand name "PIFOC".

These known drives permit a fine-positioning of objects, in particular objective lenses for microscopes, involving relatively long adjusting distances with a settling time of some milliseconds. As compared to motor drives an essentially faster reaction is obtained, and a longer service life of such arrangements can be assumed. The objective lens offset is at a minimum owing to a parallel flexure guide. The aforementioned flexure guide system is based on frictionless solid-body joints. The movement of a flexure joint is based on the elastic deformation of a solid body so that no static friction or rolling friction or sliding friction will occur. Corresponding flexure elements exhibit a very high rigidity, along with a great loading capacity, and are insensitive to shock loads and vibrations. It is an advantage that flexure guides may simultaneously act as a lever transmission so that rigid and exact nanopositioning systems with long adjusting distances can be realized.

A system for the optical scan microscopy to obtain image data is known from WO 2011/049608 A2. The solution thereof provides for a focusing unit which is connected to a microscope objective such that same can carry out movements between an image sensor and an objective carrier table for the purpose of sharpness control. A sensor evaluating the image definition is exposed by a beam splitter, with a lens arrangement being located between the beam splitter and the focusing sensor and being subjected to a so-called dither movement. The movement of the XY objective carrier table is phase-coupled to the movement of the dither lens arrangement. This phase coupling is to provide for the possibility to accelerate the focusing process so that, within a short time, a relatively great number of samples can be viewed and the amount of data obtained can be evaluated.

With regard to the prior art reference is additionally made to EP 1 433 209 B1 describing an actuator unit with at least two actuator elements, in particular in the form of an actuating drive for a fuel injection valve for an internal combustion engine.

According to the problem definition described in this document the noise emission of the actuator elements is to be reduced. This object can be achieved by the known actuator unit comprising at least two actuator elements which when electrically activated each experience a change in length and which are connected to a control device by means of an interactive connection. The directions of the axial movements of the first and second actuator element as well as the direction of movement of the control device can be oriented in each case axially parallel to one another so that an approximate mass balance is achieved which leads to a considerable reduction in the external noise radiation of the actuator unit. Preferably, it is provided in EP 1 433 209 B1 that a vectorial sum of the mass impulses of the at least two actuator elements is approximately equal to zero at any given time. In other words, the products from the masses and the speeds of the two actuator elements add up vectorially to a total of zero.

Based on the foregoing it is the object of the invention to provide a further developed method and an arrangement for operating a dynamic nanofocusing system for the use thereof in the field of microscopy, interferometry or similar applications with the aim of accelerating the focusing processes, so that new application possibilities for such nanopositioning systems are obtained and the costs in use are reduced.

The solution to the object of the invention is achieved by a method according to the teaching of the patent claims and by an arrangement according to the feature combination of the patent claims. The dependent claims describe at least useful embodiments and further developments.

Accordingly, there is proposed a method, respectively arrangement, for operating a operating a dynamic nanofocusing system for the use thereof in the field of microscopy, interferometry or similar applications, wherein the nanofocusing system comprises a preferably lever-transmitted piezo actuator and a frictionless guide. The frictionless guide is particularly based on an elastically deformable solid-body joint which is connected to a receiving unit, in particular for an objective lens or objective lens unit, so as to realize the desired adjusting distances for the focusing.

According to the invention, according to the method aspect of the present disclosure, in order to increase the dynamics during the focusing process a secondary fine-adjusting movement with a smaller adjusting distance but a higher frequency is superimposed on the primary adjusting movement which can be defined as a coarse movement.

When the fine adjustment is carried out it is determined whether the focusing result varies, in order to specify after this the amount and/or the direction of the primary coarse-adjusting movement. The superimposed fine adjustment results in a small reciprocating travel distance. It is checked during this reciprocating movement whether the obtained image becomes sharper or remains sharp, or whether the sharpness varies in a negative way. This knowledge of the varied sharpness can be gained very fast due to the high frequency of the reciprocating movement, so that then a control variable for the coarse movement can be derived which cannot be implemented at any speed owing to the properties of the coarse drive and the mass to be moved.

In a preferred embodiment, accordingly a coarse piezo actuator is combined with two fine piezo actuators in a special configuration, wherein a moment compensation of the object to be moved, in particular the objective lens, is carried out additionally.

In the embodiment on the method side the primary coarse-adjusting movement includes adjusting distances in the range of up to 1000 μm and the secondary fine-adjusting movement includes adjusting distances in the range of up to 500 nm.

The fine-adjusting movement is preferably realized in the form of a square-wave signal.

The frequency of the fine adjustment may amount up to 500 Hz, preferably 200 Hz, and is above a multiple of the frequency of the movement of the lever-transmitted piezo actuator for the coarse adjustment.

As was already briefly outlined before, additional piezo actuators are used for the fine-adjusting movement, which are preferably designed as shear actuators.

The moment compensation of the mass carried by the receiving unit is carried out for the purpose of improving the dynamics and obtaining a freedom from recoil and vibrations to a greatest possible extent.

A first one of the additional piezo actuators is connected to the mass carried by the receiving unit, and a second one of the additional piezo actuators is connected to the compensation mass, wherein the first and the second piezo actuator form a moment compensation drive and wherein further the movement paths of the actuators are preferably on a straight line.

In the arrangement according to the invention a first and a second tubular piezo shear actuator are fixed to the receiving unit which is driven by the lever-transmitted coarse-adjustment piezo actuator.

The first tubular piezo shear actuator is, for its part, connected to the body to be moved, in particular an objective lens, and the second tubular piezo shear actuator is connected to a compensation mass.

The compensation mass is adjusted to the body to be moved and the mass thereof.

To receive the required forces the tubular piezo shear actuators are connected to the receiving unit and the body to be moved, respectively the compensation mass, over a large surface by adhesive force, in particular by adhesive bonding.

In a preferred embodiment the compensation mass is formed by a hollow-cylindrical weight body which partially encloses the body to be moved. A quasi concentric arrangement of compensation mass and the body to be moved results in an arrangement of a small size which is an advantage for the use of the nanofocusing system.

The invention will be explained in more detail below by means of an exemplary embodiment and figures.

Figure 2:
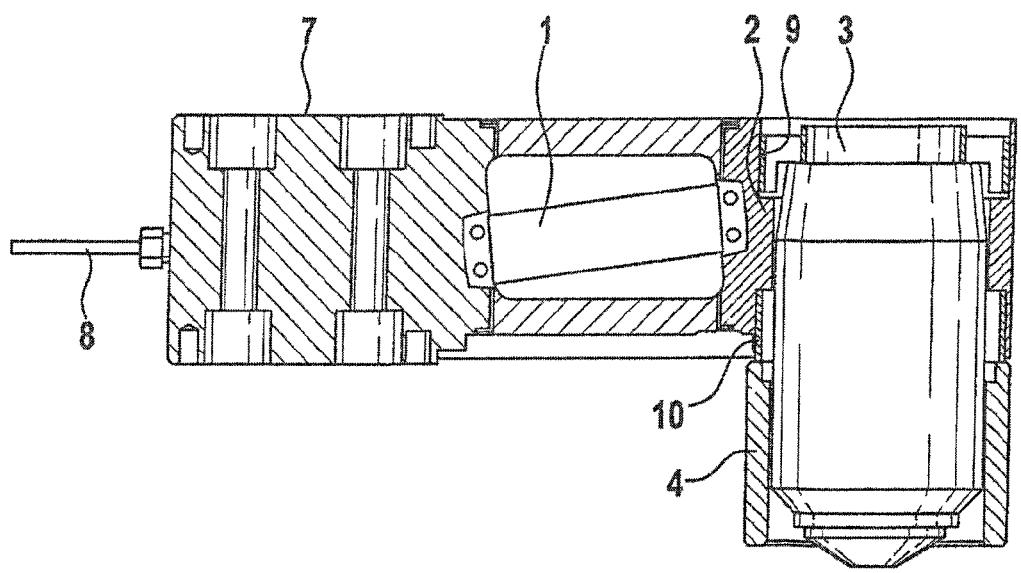
Figure 3:
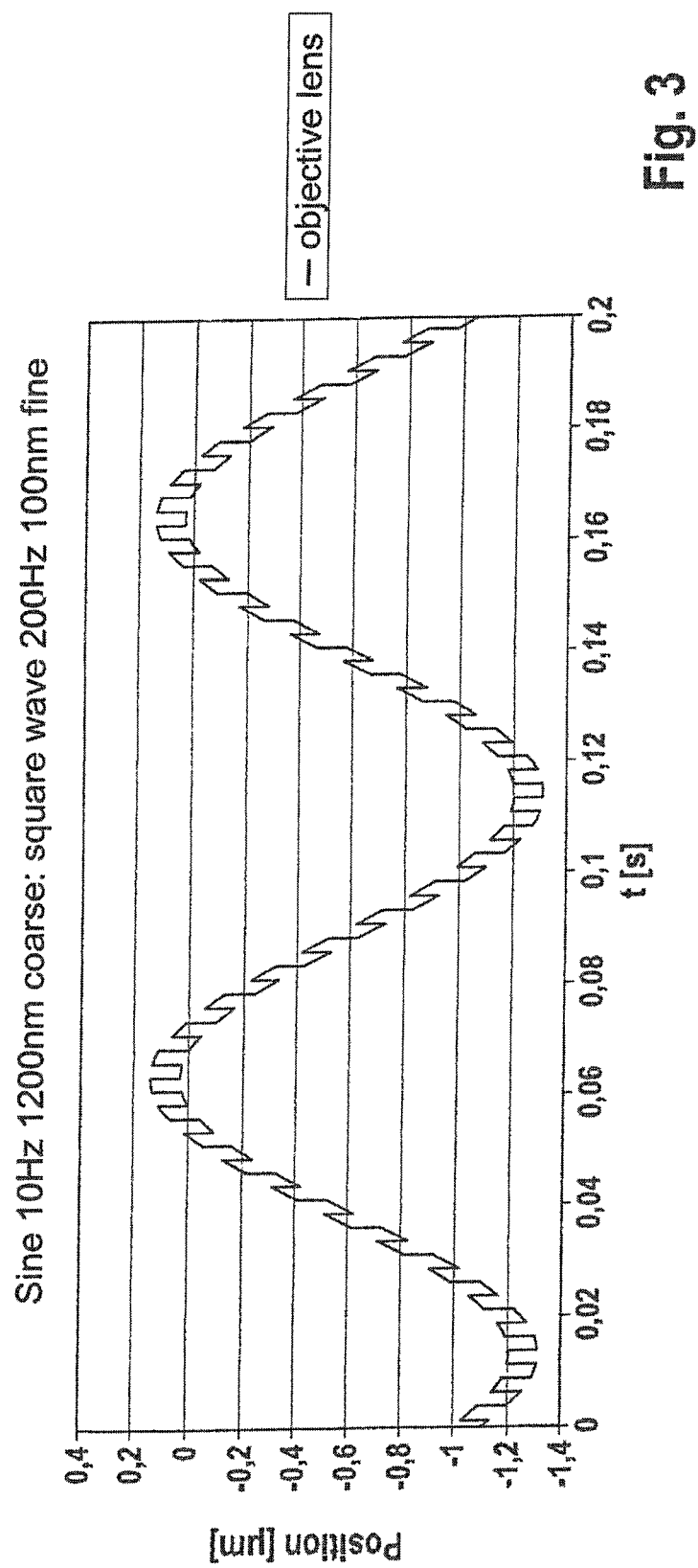
Figure 4:
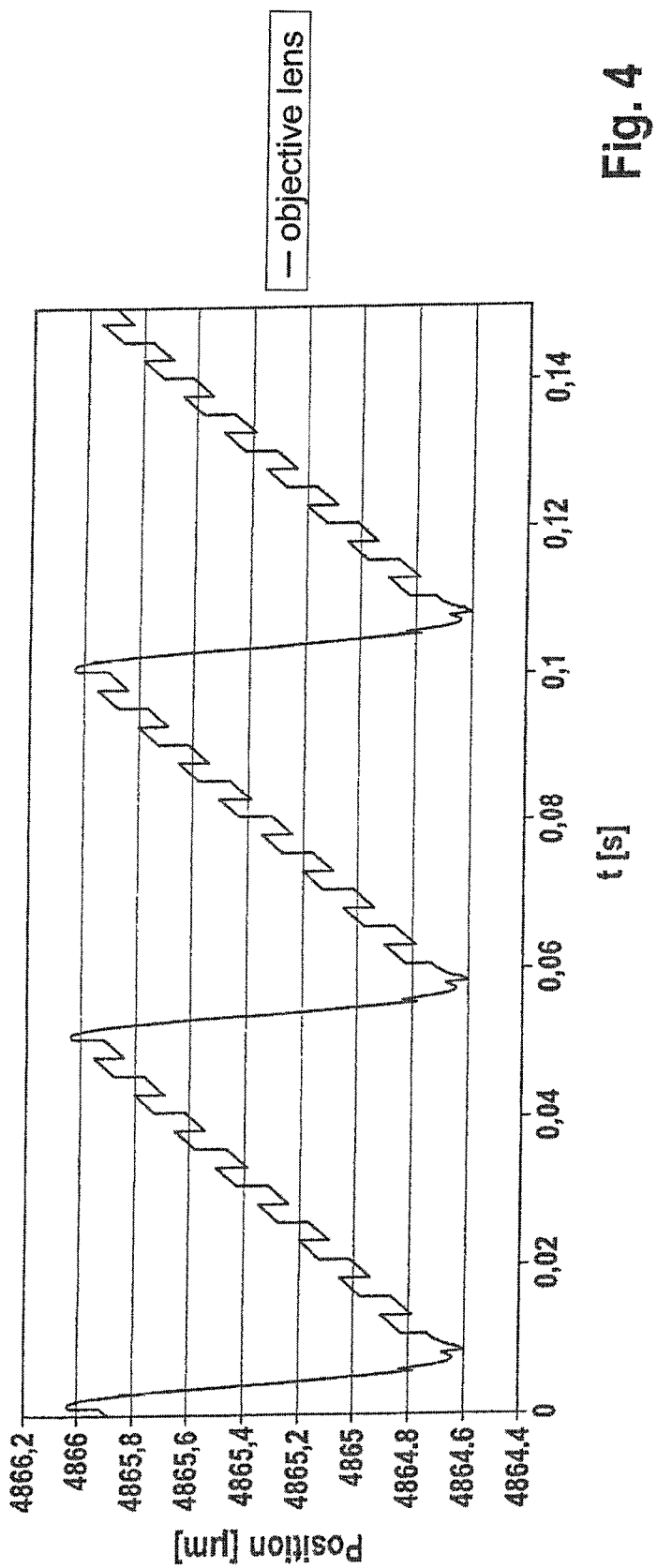
Figure 5:
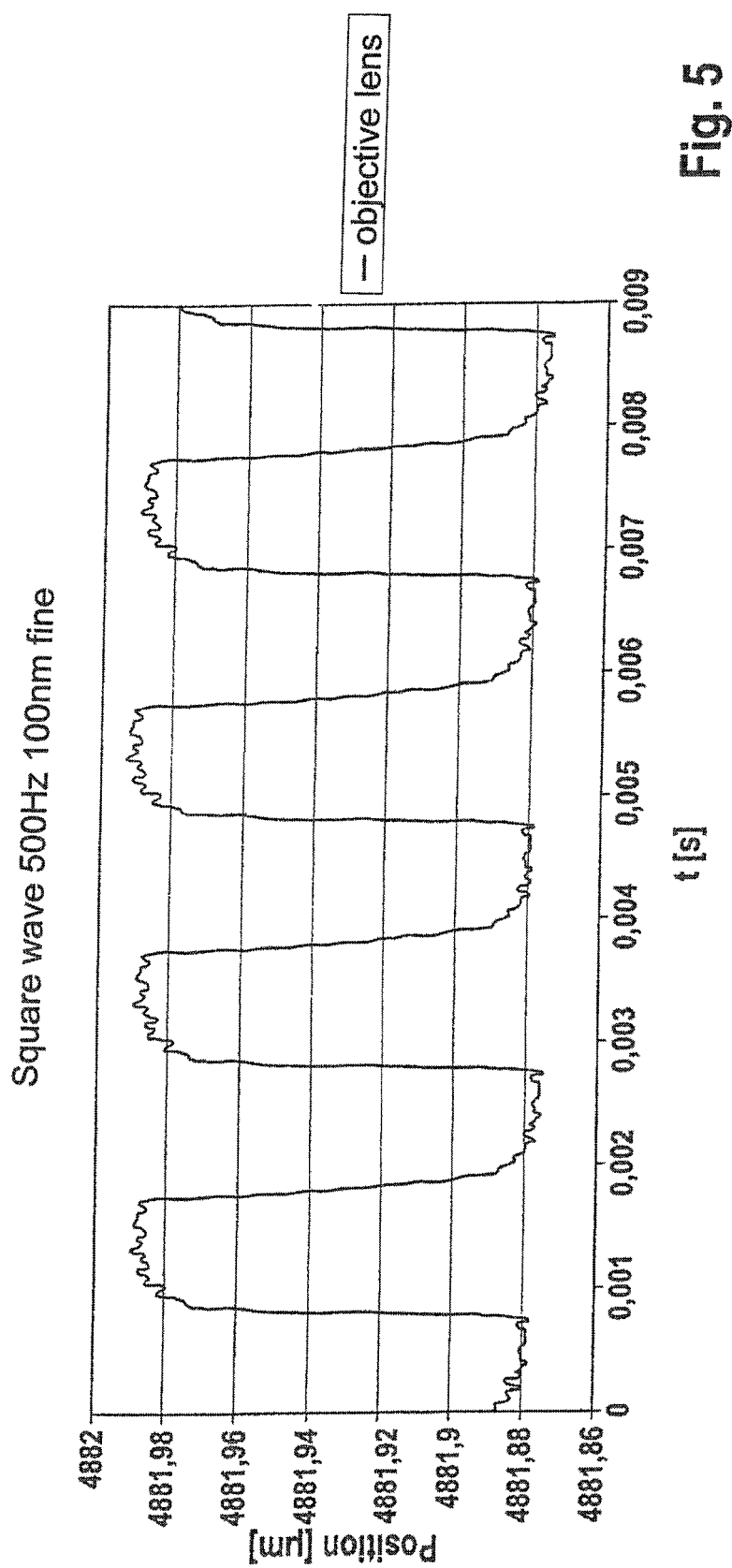
Figure 6:
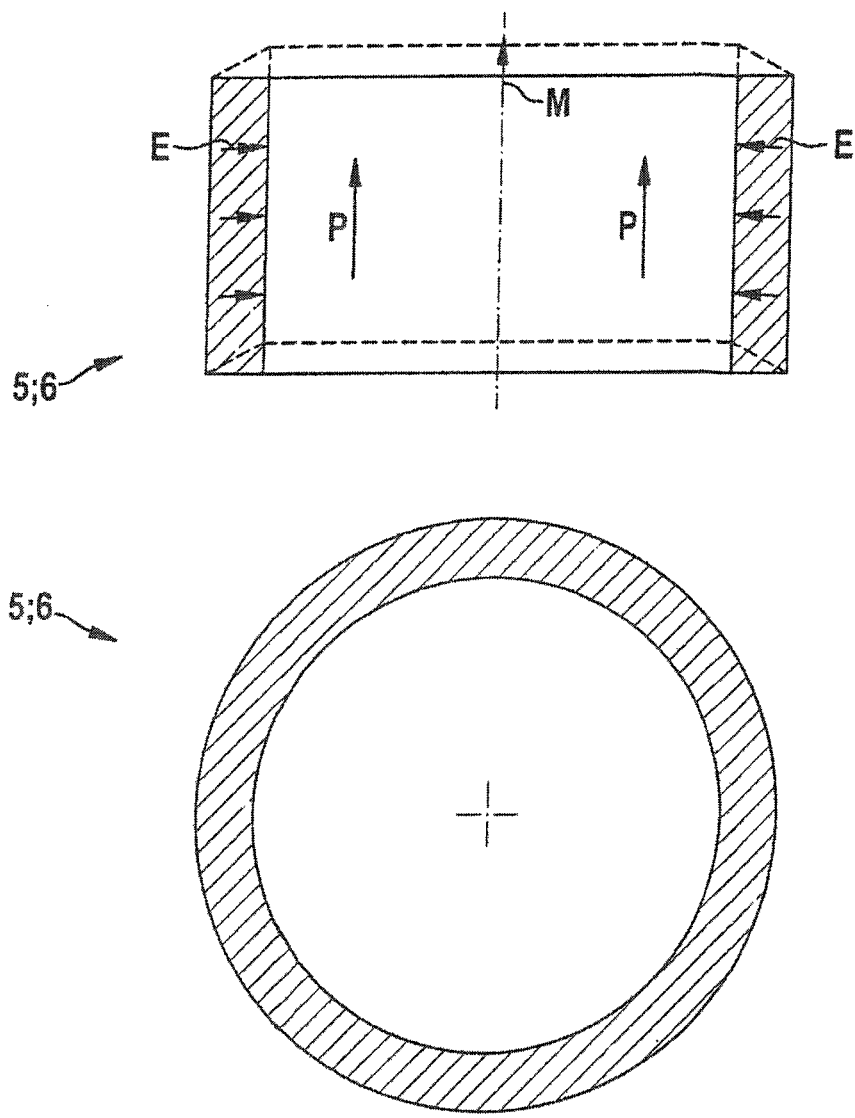

The figures show:

FIG. 1 a schematic view of an arrangement of a lever-transmitted piezo actuator as a coarse drive and two additional piezo actuators as fine drives and for the purpose of the moment compensation by a compensation mass;

FIG. 2 a sectional view through a realized arrangement of a nanopositioning system according to the invention with a primary coarse-adjusting movement arrangement and an objective lens located in a receiving unit together with a moment compensation and fine-adjustment piezo shear actuators;

FIG. 3 different typical movement patterns in reference to the objective lens of FIG. 2 to 5 in a sine shape (FIG. 3), sawtooth shape (FIG. 4) and square-wave signal shape (FIG. 5) of the coarse drive together with a superimposed, substantially square-wave signal shaped movement of the fine drive, and FIG. 6 a longitudinal section (upper part of the illustration) and a top view of the tubular piezo shear actuators used according to the invention, identifying the polarization direction P and the direction of the applied electric field E and the direction of movement M.

According to the schematic view shown in FIG. 1 the nanofocusing system according to the embodiment, to be used in the field of microscopy, is based on a lever-transmitted coarse piezo actuator 1 which allows a frictionless guidance on the basis of elastically deformable solid-body joints.

This lever-transmitted piezo actuator 1 is operatively connected to a receiving unit 2. This receiving unit 2 fixes a microscope objective lens 3 and a compensation mass 4.

The receiving unit 2 is not directly connected to the compensation mass 4 and the objective lens. Rather, a first piezo shear actuator 5 and a second piezo shear actuator 6 are interposed.

Accordingly, in order to increase the dynamics during the actual focusing process a secondary fine-adjusting movement by the piezo actuators 5 and 6 with a smaller adjusting distance but a higher frequency is superimposed on the primary adjusting movement by means of the piezo actuator 1.

Then, while the fine adjustment is carried out it is checked whether the focusing result varies, in order to specify after this the amount and/or the direction of the primary coarse-adjusting movement on the basis of piezo actuator 1.

To improve the dynamics and to obtain a freedom from recoil and vibrations to a greatest possible extent a moment compensation of the mass of the objective lens 3 is carried out according to the schematic representation of FIG. 1 by the compensation mass 4.

Details of a realized setup of a nanofocusing system for the objective lenses of microscopes are shown in the sectional view of FIG. 2.

A housing body 7 receives all essential functional elements of the nanofocusing system and comprises an electrical terminal connection 8.

The lever-transmitted coarse-adjustment piezo actuator 1 leading to the receiving unit 2 is located inside the housing 7.

A first tubular piezo shear actuator 9 is connected, on the one hand, to the drive unit 2, in particular by adhesive bonding, and is in mechanical contact, on the other hand, with the objective lens 3.

A second tubular piezo shear actuator 10 is equally connected to the receiving unit 2, but is in contact with the compensation mass 4.

The tubular piezo shear actuators 9 and 10 are in contact with the receiving unit 2 by the aforementioned large-surface adhesive bonding, so that all occurring forces can be transmitted. In one embodiment the piezo shear actuators 9 and 10 have a diameter of approximately 30 mm to 35 mm, with a height of 8 mm.

According to the illustration shown in FIG. 2 the compensation mass 4 is formed by a hollow-cylindrical weight body which encloses the objective lens 3 at least partially, defining a concentric arrangement with a small installation space.

The combination of a coarse adjustment with a superimposed fine adjustment together with a moment compensation leads to an operation free from recoils during a fast focusing. The moment compensation prevents disturbing acceleration forces, resulting in a greater dynamics range of the nanopositioning system.

The illustrations according to FIG. 3 to 5 show typical movement patterns in reference to the objective lens resulting from the coarse positioning in the micrometer range and the superimposed fine adjustment as a square-wave signal in the range between 200 Hz and 500 Hz. The degree of the fine adjustment is here approximately ±100 nm with a coarse-adjusting distance in the micrometer range. The superposition of a fine-adjusting movement according to the invention together with the moment compensation may be realized for any conceivable forms of movement of the coarse adjustment in the form of a sinusoidal movement, a square-wave movement or a sawtooth movement.

FIG. 6 shows a schematic view of the tubular piezo shear actuators 5; 6 according to the invention. The upper illustration of FIG. 6 shows a longitudinal section, depicting the polarization direction P, the direction of the applied electric field E and the resultant direction of movement M. The tubular, respectively cylindrical, embodiment of the shear actuator allows a small-sized mounting and accommodation both of the objective lens and the compensation mass, as was explained before in conjunction with FIGS. 1 and 2.

The invention claimed is:

1. A dynamic nanofocusing system so as to realize desired adjusting distances for focusing for the use thereof in the field of microscopy, interferometry or similar applications, the nanofocusing system comprising:
    a lever-transmitted coarse-adjustment piezo actuator and a frictionless guide based on an elastically deformable solid-body joint which is connected to a receiving unit that carries a body to be moved having a mass so as to realize the desired adjusting distances for the focusing;
    a first and a second tubular piezo shear actuator which are fixed to the receiving unit which is driven by the lever-transmitted coarse-adjustment piezo actuator; and
    a compensation mass;
    wherein the first tubular piezo shear actuator is, for its part, connected to the body to be moved and the second tubular piezo shear actuator is connected to the compensation mass.

2. A dynamic nanofocusing system for the use thereof in the field of microscopy, interferometry or similar applications according to claim 1,
characterized in that
the tubular piezo shear actuators are connected to the receiving unit and the body to be moved or the compensation mass over a large surface by adhesive force.

3. A dynamic nanofocusing system for the use thereof in the field of microscopy, interferometry or similar applications according to claim 1,
characterized in that
the compensation mass is formed by a hollow-cylindrical weight body which partially encloses the body to be moved.

4. A dynamic nanofocusing system so as to realize desired adjusting distances for focusing for the use thereof in the field of microscopy, interferometry or similar applications, the nanofocusing system comprising:
    a lever-transmitted coarse-adjustment piezo actuator and a frictionless guide based on an elastically deformable solid-body joint which is connected to a receiving unit that carries a body to be moved having a mass so as to realize the desired adjusting distances for the focusing;
    a first and a second tubular piezo shear actuator which are fixed to the receiving unit which is driven by the lever-transmitted coarse-adjustment piezo actuator; and
    a compensation mass;
    wherein the first tubular piezo shear actuator is, for its part, connected to an objective lens, and the second tubular piezo shear actuator is connected to the compensation mass.

5. A dynamic nanofocusing system for the use thereof in the field of microscopy, interferometry or similar applications according to claim 4, wherein the tubular piezo shear actuators are connected to the objective lens or the compensation mass over a large surface by adhesive force.

6. A dynamic nanofocusing system for the use thereof in the field of microscopy, interferometry or similar applications according to claim 4, wherein the compensation mass is formed by a hollow-cylindrical weight body which partially encloses the objective lens.

\* \* \* \* \*